(12) United States Patent
Nystrom et al.

(10) Patent No.: US 10,442,174 B2
(45) Date of Patent: Oct. 15, 2019

(54) MATERIAL FEEDER FOR ENGINEERING POLYMER EJECTION SYSTEM FOR ADDITIVE MANUFACTURING APPLICATIONS

(71) Applicant: XEROX CORPORATION, Norwalk, CT (US)

(72) Inventors: Peter J Nystrom, Webster, NY (US);
Barry P Mandel, Fairport, NY (US);
David A Mantell, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 666 days.

(21) Appl. No.: 14/962,132

(22) Filed: Dec. 8, 2015

(65) Prior Publication Data

US 2017/0157843 A1 Jun. 8, 2017

(51) Int. Cl.
*B33Y 10/00* (2015.01)
*B33Y 30/00* (2015.01)
*B29C 64/112* (2017.01)
*B29C 64/20* (2017.01)

(52) U.S. Cl.
CPC ............ *B33Y 10/00* (2014.12); *B29C 64/112* (2017.08); *B29C 64/20* (2017.08); *B33Y 30/00* (2014.12)

(58) Field of Classification Search
CPC ..................................................... B33Y 10/00
See application file for complete search history.

(56) References Cited

U.S. PATENT DOCUMENTS

| | | | |
|---|---|---|---|
| 6,593,053 B1 | 7/2003 | Chang et al. | |
| 6,773,249 B1 | 8/2004 | Przytulla et al. | |
| 7,604,470 B2 | 10/2009 | LaBossiere et al. | |
| 7,765,949 B2 | 8/2010 | Fork et al. | |
| 8,002,254 B2 | 8/2011 | Bayer et al. | |
| 8,801,415 B2 | 8/2014 | Khoshnevis | |
| 8,827,684 B1 | 9/2014 | Schumacher et al. | |
| 2004/0164436 A1 | 8/2004 | Khoshnevis | |
| 2004/0253365 A1 | 12/2004 | Warren et al. | |
| 2005/0103902 A1 | 5/2005 | Hornsell et al. | |

(Continued)

FOREIGN PATENT DOCUMENTS

| WO | 2014/200595 A2 | 12/2014 |
|---|---|---|
| WO | 2015/027938 A1 | 3/2015 |
| WO | 2014/077262 A1 | 5/2015 |

OTHER PUBLICATIONS

Nystrom et al., "Pin-Actuated Printhead," U.S. Appl. No. 14/717,560, filed May 20, 2015.
Author Unknown, "ABS Material Data Sheet," http://222.teststandard.com/data_sheets/ABS_Data_Sheet.pdf, accessed Dec. 15, 2016, 1 pg.
Simplify 3D; Printing with Multiple Extruders; Jul. 23, 2015; 5 Pages; www.simplify3d.com/support/tutorials.
3ders.org; New 3-way extruder and color blending nozzle developed for multi-colour/material 3D printing; 3D Printing Technology; Aug. 25, 2012; 11 Pages; www.3ders.org.

(Continued)

*Primary Examiner* — Larry W Thrower
(74) *Attorney, Agent, or Firm* — MH2 Technology Law Group LLP (57) ABSTRACT

A 3D printer including a pin actuated printhead having an orifice through which a material is ejected, a material chamber to hold the material to be ejected, a channel connecting the material chamber to the orifice, a pin chamber, and an actuated pin within the pin chamber, wherein the actuated pin extends through the pin chamber to eject the material from the orifice. The printhead is configured to eject a material with a viscosity of 10,000 cP or more at an elevated temperature. The 3D printer further includes a material delivery system having a filament driver and a filament heater.

13 Claims, 12 Drawing Sheets

(56) References Cited

U.S. PATENT DOCUMENTS

| | | |
|---|---|---|
| 2014/0039659 A1 | 2/2014 | Boyer et al. |
| 2014/0048969 A1 | 2/2014 | Swanson et al. |
| 2014/0121813 A1 | 5/2014 | Schmehl |
| 2014/0242208 A1 | 8/2014 | Elsworthy |
| 2014/0291886 A1 | 10/2014 | Mark et al. |
| 2014/0328964 A1 | 11/2014 | Mark et al. |
| 2014/0363532 A1 | 12/2014 | Wolfgram |
| 2015/0035198 A1 | 2/2015 | Saba |
| 2015/0056432 A1 | 2/2015 | Solbert |
| 2015/0077215 A1 | 3/2015 | Ranky et al. |
| 2015/0093465 A1 | 4/2015 | Page |
| 2016/0009029 A1* | 1/2016 | Cohen ................ B29C 67/0085 264/493 |
| 2016/0075089 A1 | 3/2016 | Duro Royo et al. |
| 2016/0325498 A1 | 11/2016 | Gelbart |

OTHER PUBLICATIONS

Francis X. Govers III; Diamond Hotend makes multi-color 3D printing possible from a single nozzle; Gizmag; Apr. 12, 2015; 6 Pages; www.gizmag.com.

e3d-online.com; Multi-Extrusion; E3D-Online; 2014; 6 Pages; www.e3d-online.com/Multi-Extrusion.

Nscrypt, Inc.; World-wide Leader in Micro to Pico-liter Dispensing Systems with our Patented Micro Dispense Pump; nScrypt, Inc.; 2001-2012; 3 Pages; www.nscrypt.com.

Isaac Budmen; Understanding Shells, Layer Height and Infill; Team Budmen; Sep. 2013; 1 Page; www.blog.teambudmen.com.

\* cited by examiner

MATERIAL FEEDER FOR ENGINEERING POLYMER EJECTION SYSTEM FOR ADDITIVE MANUFACTURING APPLICATIONS

BACKGROUND

Additive manufacturing processes (e.g., 3D printing, the formation of 3D printed structures) involve the deposition of successive layers of a material to create a three-dimensional object, for example, using a 3D printer. These processes may be performed using inkjet printheads to deposit photopolymers to form an object. Inkjet printheads typically eject liquid ink through a nozzle in a nozzle plate. However, with most current printheads, a viscosity of a material ejected through the nozzle must be from 10-20 centipoise (cP) or less. While additive manufacturing methods such as Fused Deposition Modeling (FDM) and Selective Laser Sintering (SLS) may use extremely viscous materials, these technologies have limited capability to print varying multi-material composites and to intermix deposited materials as can be done with multiple jetted materials. Accordingly, there is demand for additive manufacturing processes that can create multi-material or multi-color composites using high viscosity materials.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a 3D printer can include a pin actuated printhead having a printhead inlet, a plurality of orifices from which a material is ejected, at least one material chamber to hold the material to be ejected, a plurality of channels connecting the material chamber to the orifices, and a plurality of actuated pins that are configured to enter the orifices and to control ejection of the material from the orifices. The printhead may be configured to eject a material with a viscosity of 10,000 centipoise (cP) or more at an elevated temperature. The 3D printer can further include a material delivery system having a material delivery system outlet in fluid communication with the printhead inlet, a filament driver, and a filament heater.

In another embodiment, a method for forming a 3D printed structure can include placing a solid filament into a filament driver. Using the filament driver, the solid filament is moved into a heater to convert the solid filament into a liquid material. The method can further include introducing the liquid material into a material chamber within a printhead through a printhead inlet, injecting a volume of the liquid material from the material chamber, through a channel, and into a pin chamber, and actuating a pin through the pin chamber to control ejection of the volume of liquid material from the pin chamber through an orifice.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the drawings have been simplified and are drawn to facilitate understanding of the present teachings rather than to maintain strict structural accuracy, detail, and scale. These drawings/FIGS. are intended to be explanatory and not restrictive.

DETAILED DESCRIPTION

Reference will now be made in detail to the various embodiments in the present disclosure, examples of which are illustrated in the accompanying drawings and figures. The embodiments are described below to provide a more complete understanding of the components, processes and apparatuses disclosed herein. Any examples given are intended to be illustrative, and not restrictive. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

All physical properties that are defined hereinafter are measured at 20° to 25° Celsius unless otherwise specified. The term "room temperature" refers to 25° Celsius unless otherwise specified.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

Attention is now directed to processing procedures, methods, techniques, and workflows that are in accordance with some embodiments. Some operations in the processing procedures, methods, techniques, and workflows disclosed herein may be combined and/or the order of some operations may be changed.

In one embodiment, a pin-actuated printhead is configured to eject high viscosity materials for additive manufacturing applications. The material may include high viscosity materials, such as engineering polymers or photopolymers. In one embodiment, a material to be ejected or printed may include an adhesive filament. In another embodiment, a material may include a solder paste with solder particles suspended in a flux paste that is solid at room temperature and may be handled as a fiber. Other solid materials that may be melted and flowed can include a carrier material with particulate loading, such as metal particulates with one or more binders or fibers. The material to be ejected may include an ABS engineering polymer with a viscosity of 10,000 cP or greater, 100,000 cP or greater, or 500,000 cP or greater, at a temperature of 230° C. In other embodiments, the pin-actuated printhead may eject other high viscosity materials at an elevated temperature. Filament compositions and properties should be controlled to avoid clogging and agglomeration that would obstruct passages, channels, and orifices within the printhead.

Figure 1:
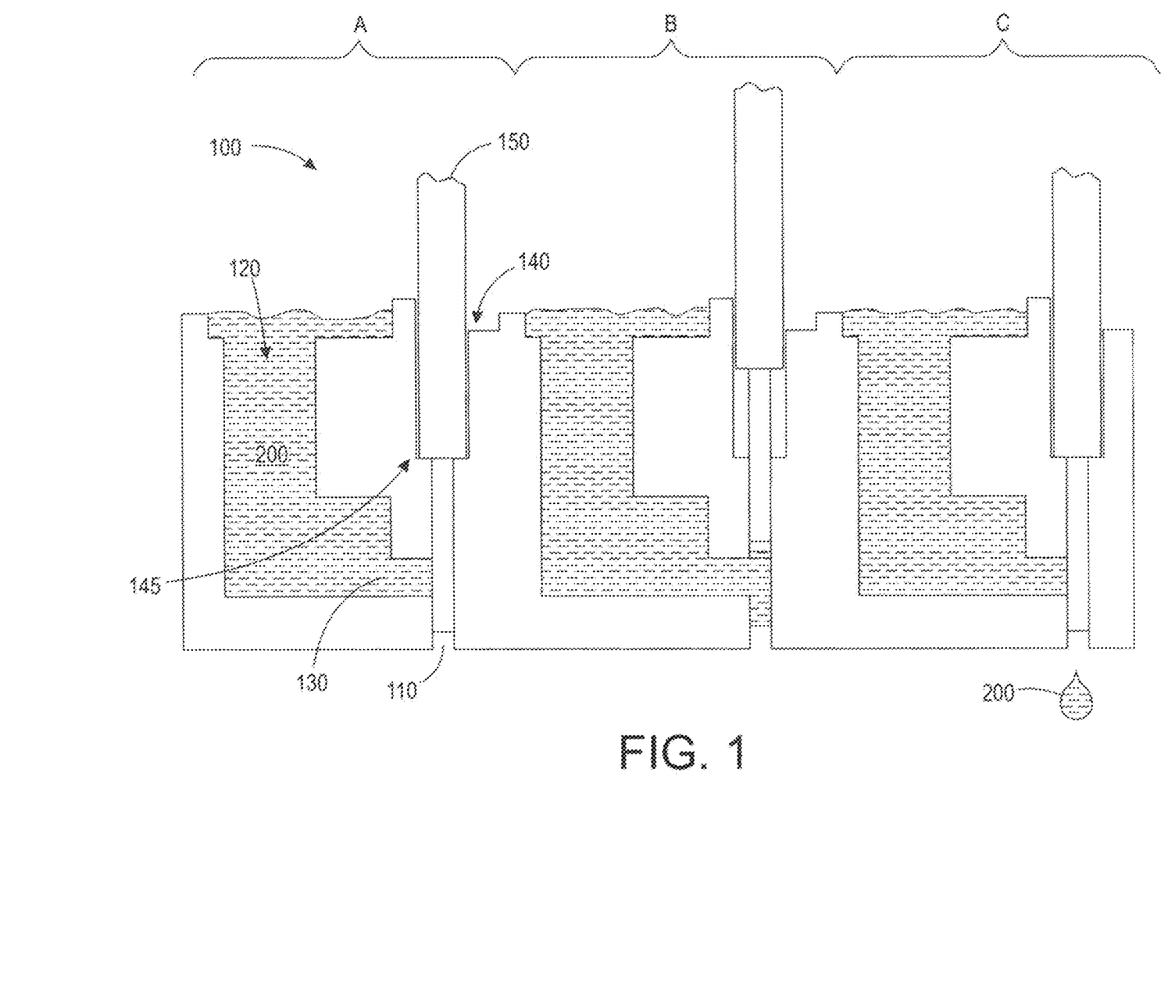
FIG. 1 illustrates a pin-actuated printhead according to an embodiment.

FIG. 1 illustrates a pin-actuated printhead according to an embodiment. As illustrated in FIG. 1, a pin-actuated printhead may include an orifice or nozzle 110, a material chamber 120, a channel 130, a pin chamber 140 that may terminate at the orifice 110, and an actuated pin 150.

The orifice 110 may be defined in a body of the printhead 100, and the printhead 100 may include one or more orifices 110. The pin chamber 140 may terminate or end at the orifice 110. In other embodiments, the printhead 100 may include an orifice plate or nozzle plate that defines one or more orifices 110. In some embodiments, the orifices 110 may be spaced apart 1 mm from each other. The orifice 110 may have a diameter between 50 and 800 microns (μm). In another embodiment, the orifice 110 may have a diameter between 125 and 500 microns or between 150 and 300 microns.

The diameter and depth of the orifice 110 may be defined according to a material 200 to be ejected or printed, for example, as a drop or an extruded material. For example, the orifice 110 may be configured for the ejection of a drop or ejection of an extruded material 200 with a diameter of about 200 μm. In one embodiment, the orifice 110 may be configured for the ejection of a drop or an extruded material 200 with a diameter between 100 μm and 300 μm. In another embodiment, the orifice 110 may be configured to eject a drop or eject an extruded material 200 with a diameter of 50 μm or greater.

The material chamber 120 may be defined within the body of the printhead, and the printhead 100 may include one or more chambers 120. For example, the printhead 100 may include one or more chambers 120 to hold different types of material 200, and the printhead 100 may be configured to mix the different types of material 200 after ejection/printing of the material 200 through the orifices 110. For example, when printing an object, the printhead 100 may eject a first type of material 200 interspersed with the ejection of a second type of material 200, where the second type of material is different from the first type of material. In some embodiments, an object created of various materials 200 may have mechanical or optical properties which are in between or an average of the two or more materials 200 used. In one embodiment, each material chamber 120 of the plurality of chambers is configured to hold a single material 200 to be ejected. In another embodiment, the plurality of chambers 120 are configured to hold a plurality of different materials 200 to be ejected.

The printhead 100 may be configured to hold materials 200 of different colors and to mix the colors of the materials 200 ejected from the orifices 110 to adjust the color of the final 3D printed product. Similarly, the printhead 100 may be configured to hold materials 200 having different material properties and combining the materials 200 as they are ejected from the orifices 110 to adjust the final properties of the 3D printed product.

The material 200 may be held under pressure within the material chamber 120 to facilitate ejection of the material 200. For example, the material chamber 120 may be configured to hold material 200 to be ejected under pressure to facilitate a flow of material 200 to the orifice 110. In some embodiments, a pressure of 100 psi should enable a 100,000 cP material 200 to flow through the channel 130 and into the orifice 110 to support a firing frequency on the order of 1000 Hz. In other embodiments, the pressure applied to the material 200 in the material chamber 120 may be adjusted according to a viscosity of the material 200, a firing frequency desired, an extrusion rate desired, and/or the dimensions of the printhead 100 components, including the orifices 110 and/or the channel 130. In one embodiment, the printhead 100 is configured to hold the material 200 at a pressure between 50 psi and 150 psi. In another embodiment, the printhead 100 is configured to hold the material 200 at a pressure of at least 25 psi. In another embodiment, the pressure may be maintained above 2000 psi while printing.

The material 200 may be held at an elevated temperature to facilitate ejection of the material 200. For example, the material chamber 120 may be configured to hold material 200 at 100*C or greater to facilitate a flow of material 200 to the orifice 110. In another embodiment, the printhead 100 may be configured to heat the material to 200° C. or greater or to 300° C. or greater.

The channel 130 may be defined within the body of the printhead 100, and the printhead 100 may include one or more channels 130. In one embodiment, the channel 130 is configured to direct material 200 to be ejected into the orifice 110. The dimensions of the channel 130 may be adjusted according to the characteristics of the material 200 to be ejected.

Figure 2:
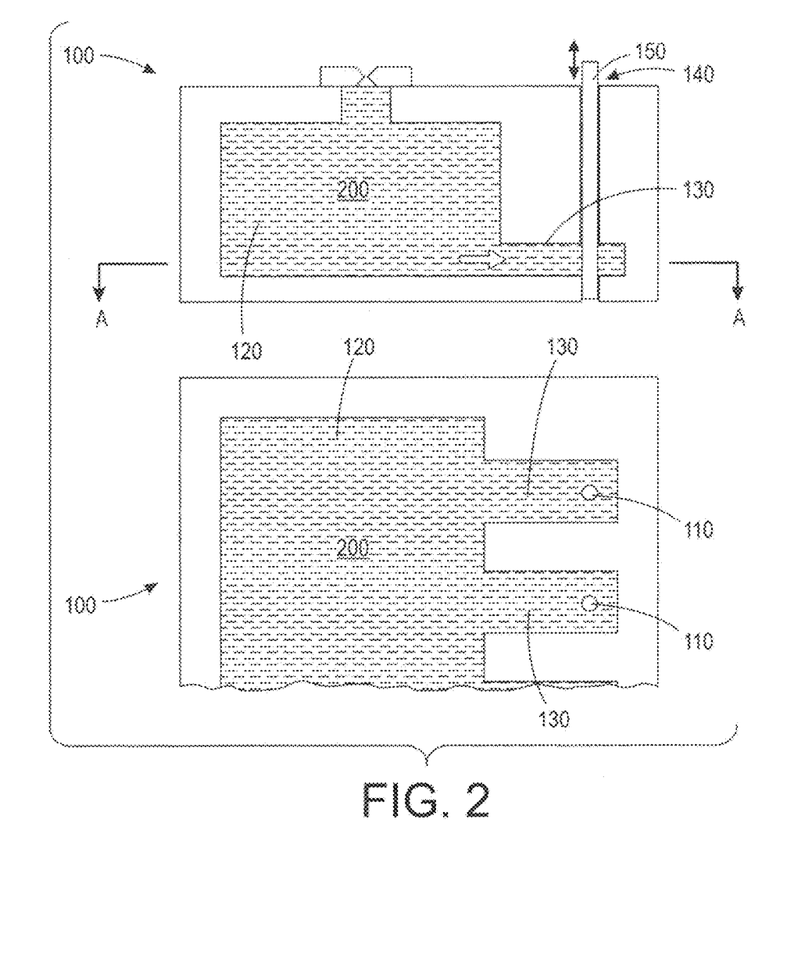
FIG. 2 illustrates a pin-actuated printhead according to an embodiment.
Figure 3:
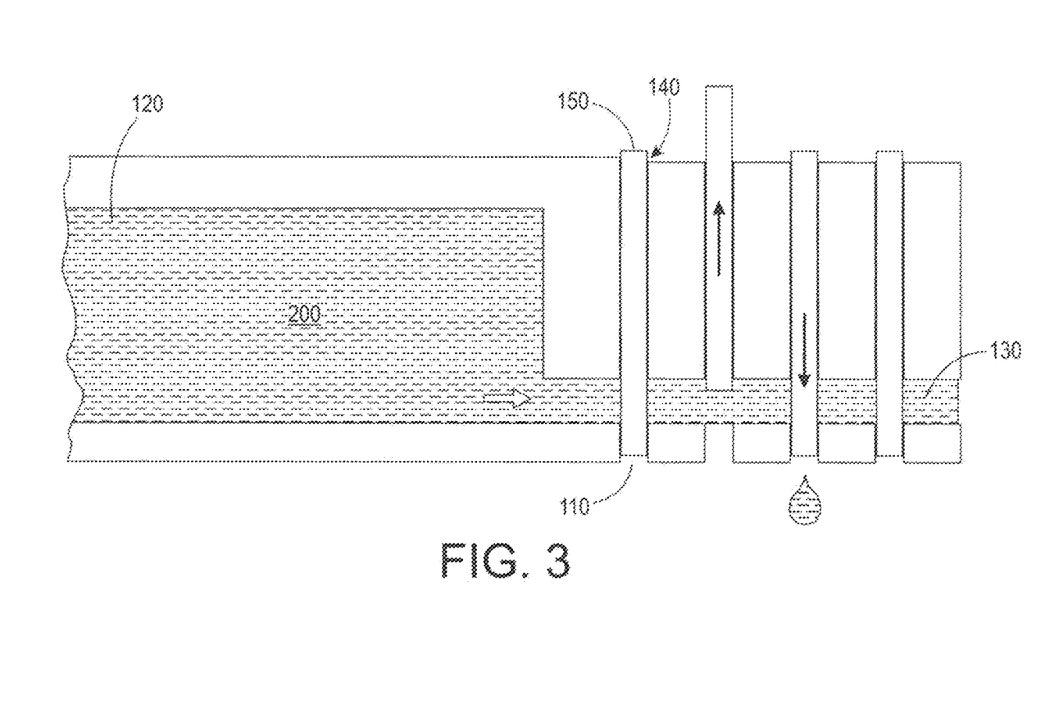
FIG. 3 illustrates a pin-actuated printhead according to an embodiment.

While FIG. 1 illustrates a printhead 100 configuration according to an embodiment, other configurations of the printhead 100 are also possible. For example, FIGS. 2 and 3 illustrate other possible configurations of a printhead 100. As illustrated in FIG. 2, a printhead 100 may be configured to have a single material chamber 120 providing material 200 to a plurality of orifices 110 through separate channels 130. Alternatively, as illustrated in FIG. 3, a printhead 100 may be configured to have a single material chamber 120 providing material 200 to a plurality of orifices 110 through a single channel 130. The embodiment illustrated in FIG. 2 may reduce a flow resistance of the material 200 in the channels 130 or may minimize a pressure loss for the material 200 in the channel 130 and may enable greater flow rates for very high viscosity materials 200.

In some embodiments, each orifice 110 has an associated actuated pin 150 to eject material within the orifice 110, and each actuated pin 150 may move within a pin chamber 140 configured to guide a movement of the actuated pin 150.

The pin chamber 140 may be defined within the body of the printhead 100, and the printhead 100 may include one or more pin chambers 140. In one embodiment, the pin chamber 140 is configured to guide the actuated pin 150 into the orifice 110. In other embodiments, the pin chamber 140 guides the actuated pin 150 through at least a portion of the channel 130 and into the orifice 110. As illustrated in FIG. 1, the pin chamber 140 may have a stepped configuration to match a step configuration of the actuated pin to limit a movement of the actuated pin 150 and to provide a seal 145 at a point in the pin chamber 140. In another embodiment, a seal 145 may be provided by diametrical tolerances between the pin chamber 140 and the actuated pin 150. For example, as illustrated in FIGS. 2 and 3, a space between the pin chamber 140 and the actuated pin 150 may be selected to allow for easy movement of the actuated pin 150 while preventing a high viscosity material 200 from entering the pin chamber 140.

The actuated pin 150 may move within the pin chamber 140 and orifice 110. For example, the actuated pin 150 may be moved via electromagnets, piezoelectric devices, or other driver mechanisms. The actuated pin 150 may be configured to push material 200 within the channel 130 and/or the orifice 110 out of the printhead 100.

Figure 8:
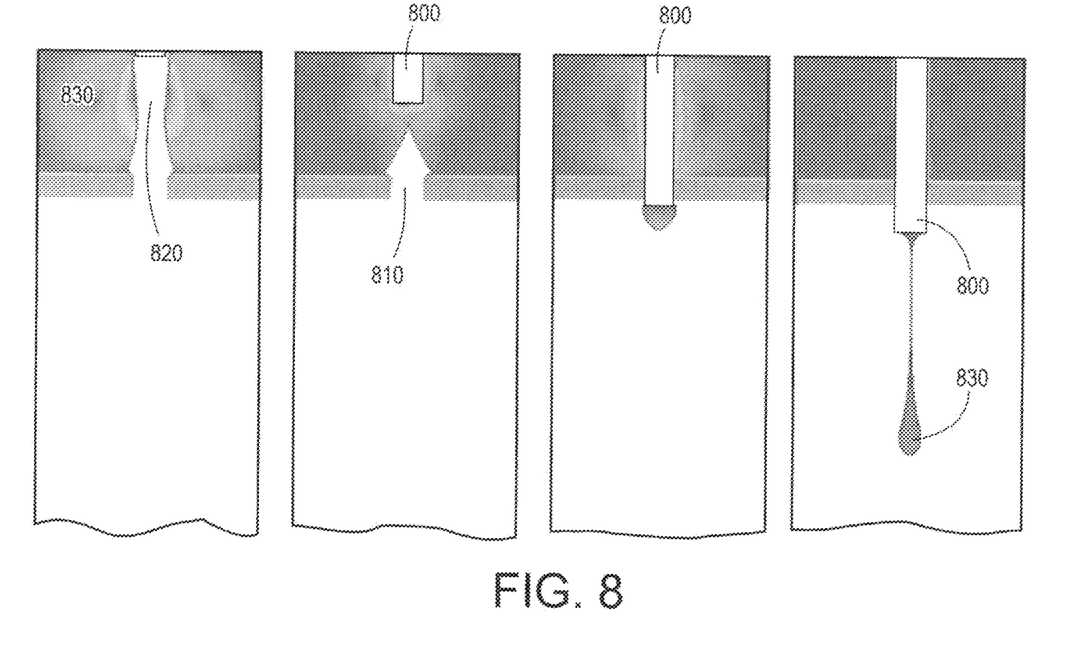
FIG. 8 illustrates a model of material ejection according to an embodiment.

In one embodiment, a firing cycle of the printhead 100 is defined by the movement of the actuated pin 150. For example, as illustrated in FIG. 1, a firing cycle may start with the actuated pin 150 in a closed position "A." The actuated pin 150 may be positioned within the orifice 110 and may prevent any significant flow of material 200 into the orifice 110. The actuated pin may then move into an open position "B," retracting the actuated pin 150 from within the orifice 110 and allowing the flow of material 200 from the chamber 130 into or through the orifice 110. In some embodiments, the actuated pin 150 may only partially retract to control the flow of an amount or volume of material into the orifice 110. Finally, the actuated pin 150 may move back into a closed position "C" to complete the firing cycle to eject the material 200 out of the orifice 110. As illustrated in FIG. 1, moving into the closed position, the actuated pin 150 may push material 200 that is within the orifice 110 out of the printhead 100 and onto a receiving surface. The actuated pin 150 may move past an outer surface of the orifice 110 to ensure contact between the material 200 and the substrate, or to eject material 200 previously within the orifice 110, for example, as illustrated in the FIG. 8 depiction described below.

In some embodiments, the actuated pin 150 may be embodied as a wire. For example, the actuated pin 150 may be a metallic wire, such as a stainless steel or tungsten wire, with a diameter between 200 to 300 micrometers (μm). In one embodiment, the actuated pin 150 may have a diameter between 100 μm and 500 μm.

The actuated pin 150 may be configured to move through the pin chamber 140 and the orifices 110 to eject the material 200. The distance traveled by the actuated pin 150 to eject the material 200 may depend on the configuration of the printhead 100 and/or the characteristics of the material 200. For example, the actuated pin may be configured to move a distance of 1.5 mm or less during firing cycles. In one embodiment, the actuated pin may move a distance of 1.0 mm or less during firing cycles. In another embodiment, the actuated pin 150 may move a distance of 0.5 mm or less. In yet another embodiment, the actuated pin 150 may move between 0.4 mm and 0.5 mm.

The actuated pin 150 may move with a velocity of 1 meter per second (M/s) or greater. In one embodiment, the actuated pin may move with a velocity of about 2 M/s or greater during firing cycles. In another one embodiment, the actuated pin may move with a velocity of 5 M/s or greater during firing cycles. In some embodiments, the actuated pin may decelerate at a rate of 20 M/sec$^2$ or greater to facilitate the separation of the viscous material from the end of the pin. For example, in some embodiments, a deceleration of the actuated pin 150 can be facilitated through the use of hard stops, or other elements, that abruptly stop the motion of the actuated pin 150.

The actuated pin 150 may be configured to achieve a firing frequency of about 1000 Hz. In one embodiment, the firing frequency of the actuated pin 150 is between 500 Hz and 1500 HZ. In another embodiment, the firing frequency of the actuated pin 150 is between 100 Hz and 2000 Hz.

In one embodiment, the actuated pin 150 includes a low adhesion material or coating, such as perfluorodecyttrichlorosilane (i.e., "FDTS") or polytetrafluoroethylene (i.e., Teflon®), to lessen an adhesion of the material 200 to the actuated pin 150.

The printhead 100 may be spaced away from a surface of the object being printed, and material 200 ejected from the printhead 100 becomes airborne when ejected from the orifices 110 while travelling towards the print surface. In another embodiment, the printhead 100 is close to the surface of the object being printed, and the actuated pins 150 carry the material ejected from the orifices 110 to a surface of the object being printed. In another embodiment, the material 200 may flow from the orifice while the pin is extracted, such that the material 200 spans the gap or space between the orifice 110 and the substrate (not individually depicted for simplicity).

Figure 4:
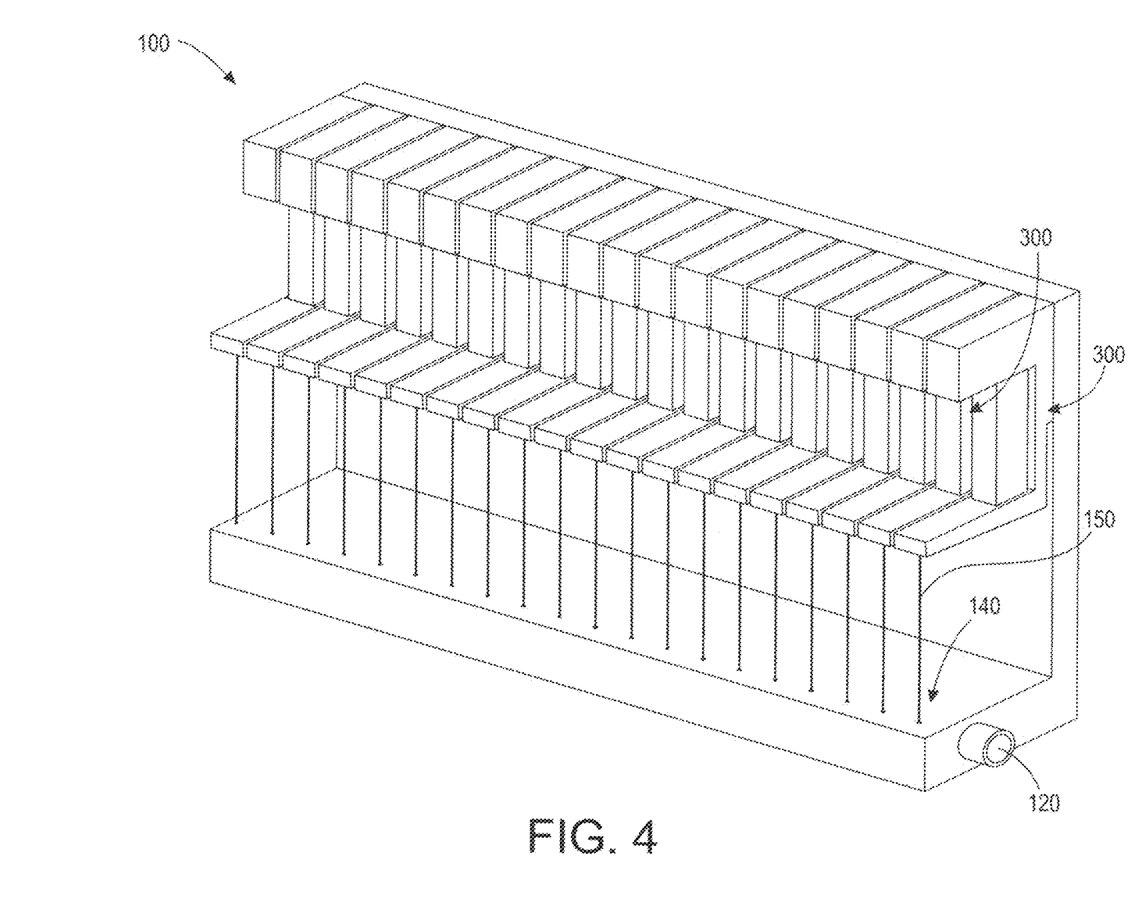
FIG. 4 illustrates a pin-actuated printhead with an actuator module according to an embodiment.

FIG. 4 illustrates a pin-actuated printhead with an actuator module according to an embodiment. A printhead 100 may include a plurality of orifices 110 to eject a material 200, a material chamber 120 to hold the material 200 to be ejected (FIG. 1), a plurality of actuated pins 150, and a plurality of actuator modules 300. It should be appreciated that a plurality of chambers 120 could be incorporated into a printhead 100, with each material chamber 120 delivering a different material to a plurality of orifices 110.

The actuator module 300 may be used to drive the movement of an actuated pin 150 within the printhead 100. In some embodiments, the actuator module 300 may be embodied as an electromagnetic actuator connected to one end of an actuated pin 150 and configured to move the actuated pin 150 within the printhead 100.

Figure 5A:
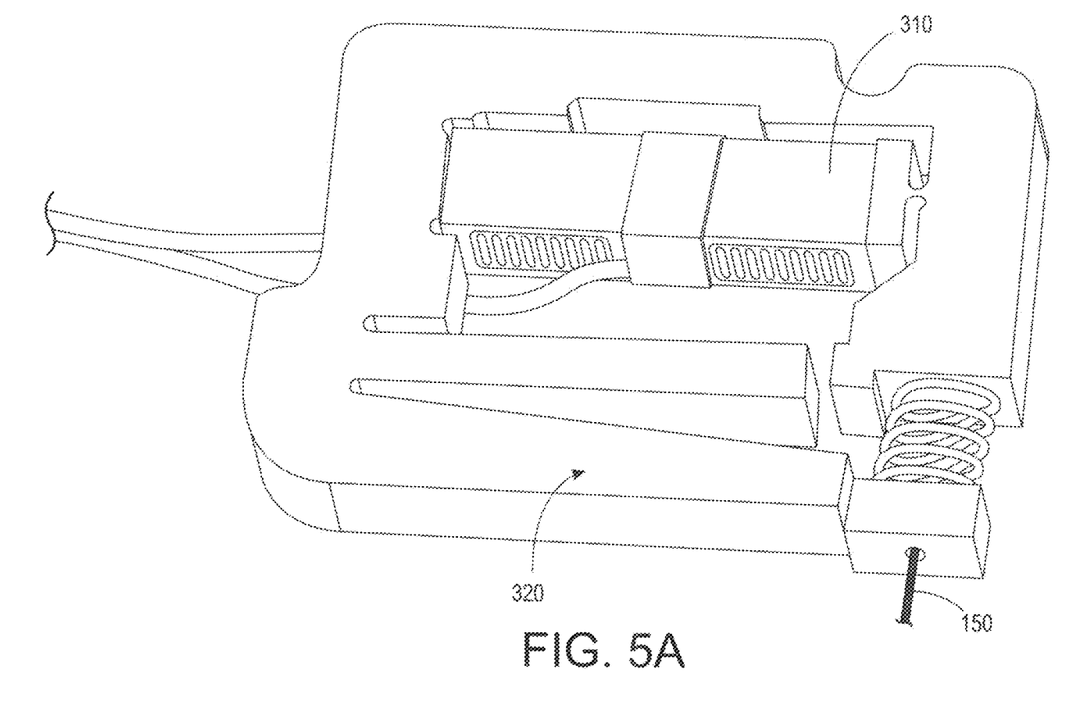
FIG. 5A illustrates an actuator module according to an embodiment.
Figure 5B:
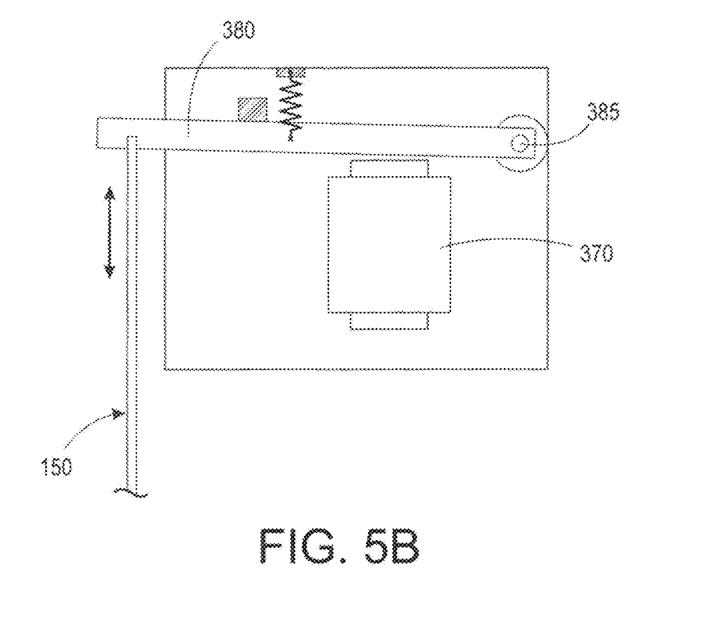
FIG. 5B illustrates an actuator module according to an embodiment.

In other embodiments, the actuator module 300 may be embodied as solenoids, electromagnets pulling on actuator arms, stacked arrays of piezo actuators, or other mechanisms to drive a movement of the actuated pins 150. Stacked piezo actuators offer high reliability and a flexure can be used to amplify the motion from a stacked piezo actuator. For example, the actuator module 300 may include a stacked piezo actuator 310 and flexures for motion amplification 320 as illustrated in FIG. 5A. As illustrated in FIG. 5B, the actuator module 300 may include an electromagnet 370 and a pivoting arm 380 which drives an actuated pin 150. The pivoting arm 380 can be positioned with a pivot point 385 close to the electromagnet 370, resulting in a small gap and strong electromagnetic attractive force, and the length of the pivoting arm 370 provides an amplification of the motion at the end where the actuated pin 150 is attached.

According to some embodiments, a configuration of a group of printheads 100 and/or the configuration of the actuator modules 300 may be modified to improve an overall density or resolution of a 3D printing system utilizing the printhead 100. For example, FIGS. 6 and 7 illustrate different configuration of pin-actuated printheads with actuator modules.

Figure 6:
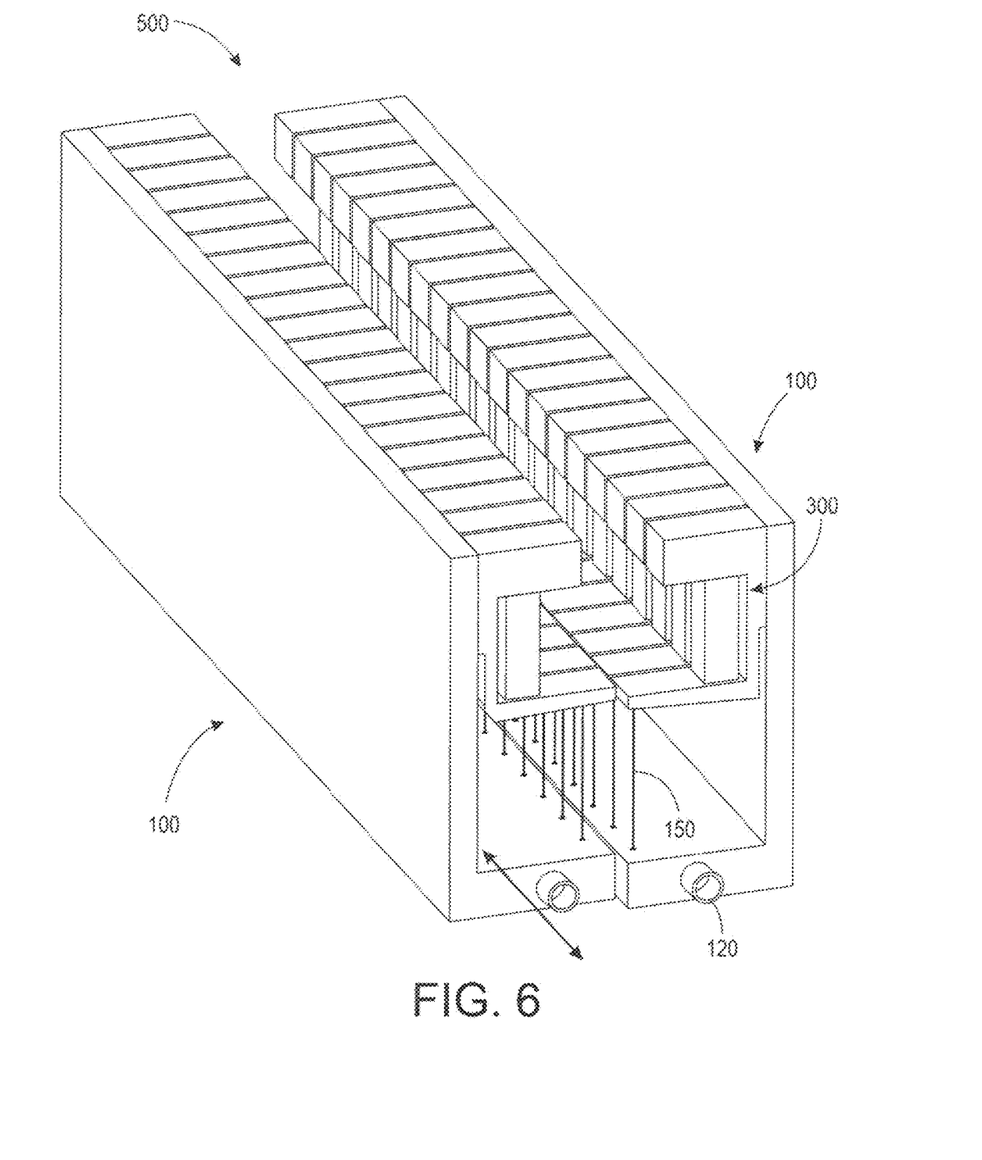
FIG. 6 illustrates a pin-actuated printhead array according to an embodiment.
Figure 7:
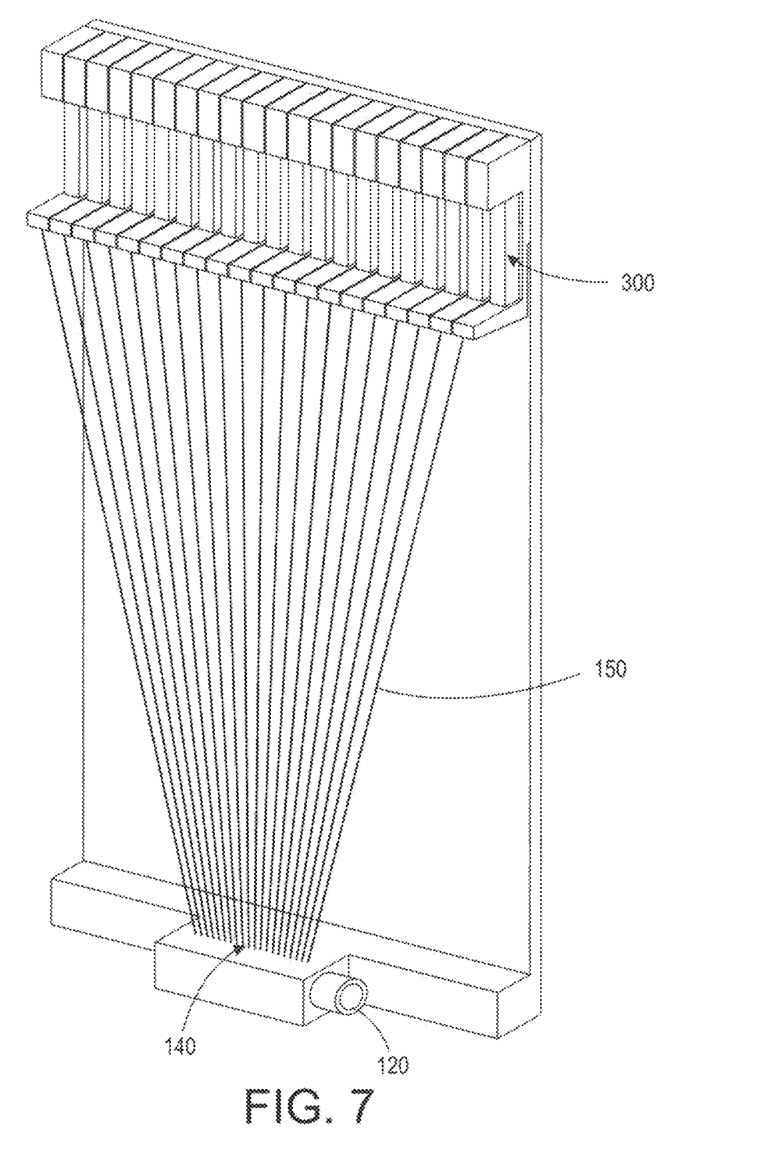
FIG. 7 illustrates a pin-actuated printhead with an actuator module according to an embodiment.

As illustrated in FIG. 6, two printheads 100, each may be positioned face-to-face and staggered to create an overall printing array 500 with a half pitch spacing between the facing orifices 110. In some embodiments, the printing array 500 can be indexed between passes to improve an overall resolution.

In other embodiments, the actuated pins 150 may be disposed in a fan-like configuration to improve the resolution or density of ejection orifices of the printhead 100. For example, as illustrated in FIG. 7, the plurality of actuated pins 150 extend at an angle from each actuator module 300 to a converging area of the printhead 100 with the orifices 110. In some embodiments, the printhead 100 may include guides to guide the actuated pins 150 and prevent buckling or flexing. The guides may be molded, machined, or otherwise formed on the printhead 100.

According to some embodiments, a volume of material 200 ejected by the printhead 100 may be controlled according to a movement of the actuated pin 150. For example, the volume of material that flows into the void created by the retraction of the actuated pin 150 from the orifice 110 and/or the channel 130 may depend on the time that the actuated pin 150 remains in the retracted position.

FIG. 8 illustrates a model of material ejection. As illustrated in FIG. 8, the retraction of an actuated pin 800 from an orifice area 810 initially creates a void 820. A material to be ejected 830 then flows into the void 820, whereby, it is ejected from the orifice area 810 by a movement of the actuated pin 800. The actuated pin 800 may eject material 830 even if the void 820 is only partially filled.

In some embodiments, a time period between retraction of the actuated pin 800 and its return movement determines the percentage of the void 820 filled by the material 830. In other embodiments, the temperature, viscosity, and other characteristics of the material 830 also determine the percentage of the void 820 filled between the movements of the actuated pin 800. Accordingly, in some embodiments, the movement of the actuated pin 800 may be controlled to adjust the size or volume of the material 830 ejected. In other embodiments, the timing of individual actuated pins 800 may be adjusted as a method of normalizing an amount of material 830 ejected. That is, the timing of the actuated pins 800 may be adjusted so that all actuated pins 800 in a group eject consistent or equal volumes of the material 830.

In one embodiment, a speed at which the actuated pin 800 moves to eject the material 830 may determine the speed of ejection for the material 830. A high speed of ejection may help minimize a drop placement during a 3D printing operation, whereas a lower ejection speed may allow the material 830 to coalesce into a more spherical drop during an ejection operation.

With respect to FIG. 1, the extent to which the orifice 110, which may extend up into the channel 130, refills with material 200 can be determined by the time period between the retraction of the actuated pin 150 (open position) and the firing of the actuated pin 150 (closed position). A long period of the actuated pin 150 in the open position allows the channel to fill completely, and the amount of material ejected to be maximized. A shorter period will only allow partial refilling, and the amount of material ejected will depend on the percentage of refilling. Accordingly, this timing difference can be used to create variable drop sizes for the ejected material 200. In some embodiments, this variation can be used to create grayscale as well as to "norm" the drop size for each orifice.

In one embodiment, the printhead 100 is between 1 mm and 10 mm away from the surface of the object being printed. In another embodiment, the drops of material 200 ejected from the printhead 100 travel between 0.5 mm and 10 mm before being deposited.

Delivery of the material 200 to be jetted, ejected, or printed to the material chamber 120, the channel 130, the pin chamber 140, and/or the orifice 110 will now be described. The material 200 may include, for example, one or more engineering polymers that may be used for additive manufacturing. Depending on the material 200 being ejected, the material 200 may be a solid at room temperature. Before delivery to the actuated pin 150, the solid material may be melted or liquefied such that the actuated pin 150 may eject the material 200 in liquid form from the pin chamber 140 through orifice 110. However, melting or other liquefaction of a large volume of material 200 prior to printing can lead to physical decomposition or degradation of the material during storage, for example, within the printhead or other reservoir, prior to ejection. Thus an embodiment of the present teachings can include a material delivery system that liquefies the material 200 just prior to printing. An embodiment can further include a material delivery system that and liquefies a volume of material that is not excessive for the print job.

Figure 9:
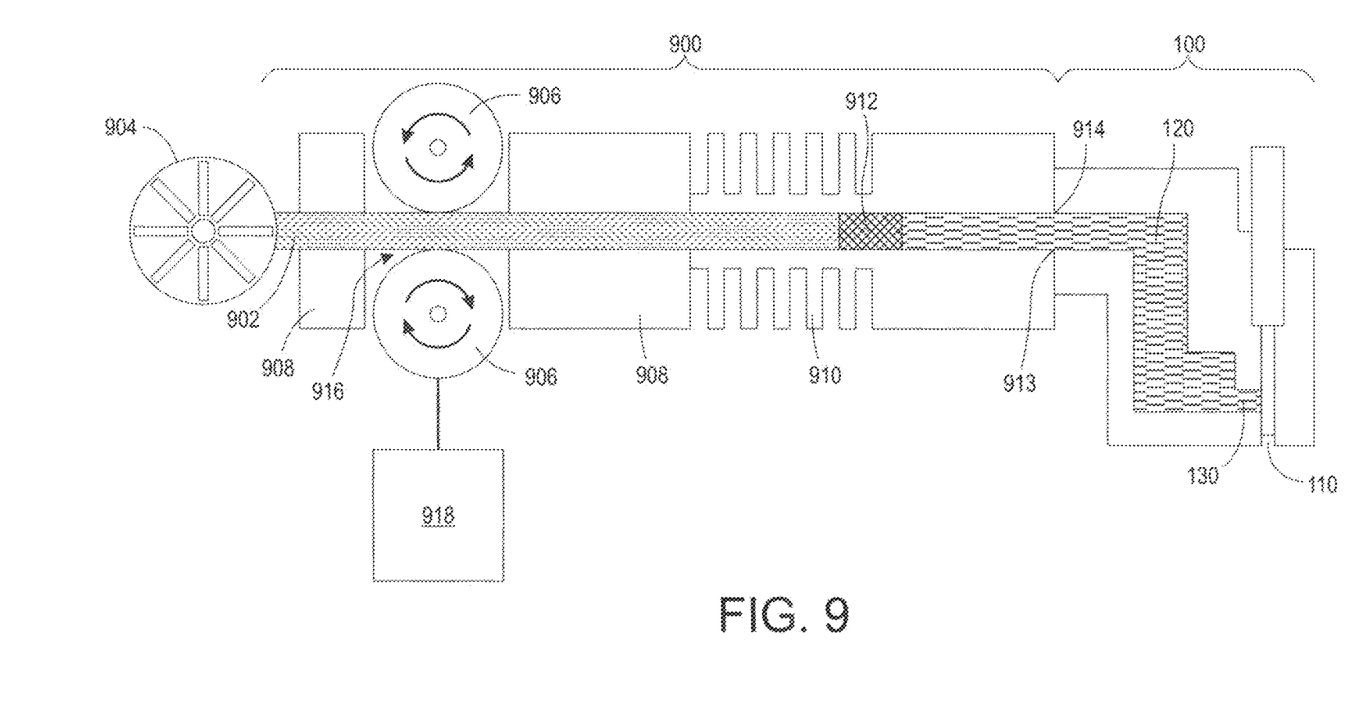
FIG. 9 illustrates a material supply device that supplies material to a pin-actuated printhead according to an embodiment.

FIG. 9 is a schematic depiction of a printhead 100 and a material delivery system 900 that delivers a volume of liquefied material 200 to the printhead 100. The printhead 100 may be a printhead as described above with reference to FIG. 1. While FIG. 9 illustrates a single actuated pin 150, it will be understood that the material delivery system 900 may also simultaneously supply material 200 to the plurality of actuated pins 150 as Illustrated in FIG. 1 using, for example, material supply channel to supply material 200 to the plurality of actuated pins 150 of FIG. 1. The solid material is melted in-line as needed, delivering the molten or liquefied material 200 to the actuated pins 150. The material delivery system 900 may be an electrical-mechanical material delivery system.

FIG. 9 further illustrates a filament 902 of material in solid form that is supplied, for example, from a supply reel 904. The filament 902 may have, for example, a square, rectangular, round, or oval cross section, and may have any sufficient width, for example, from 1.0 millimeter (mm) to 3.0 mm, 1.75 mm, greater than 3.0 mm, or another sufficient diameter depending on the use of the filament 902 and printhead 100. The filament 902 may be supplied as a rod, a bar, a strip, or in another sufficient form.

The filament 902 may be fed using a filament driver 906. In an embodiment, the filament driver 906 may include positioning the filament 902 between two or more feed wheels or gears 906. FIG. 9 illustrates a first feed wheel and a second wheel. The feed wheels 906 may be a motorized gear assembly or a wheel assembly having a deformable surface or friction coating that reduces or prevents slipping as the filament 902 is fed into the printhead 100 from the supply reel 904. As the filament 902 is fed from the supply reel 904, it may be heated by one or more filament preheaters or 908. Subsequently, one or more filament heaters (e.g., heated filament extruders) 910 soften the solid filament 902 to a pliable filament 912, then continued heating converts the pliable filament 912 to a liquid material 200, such that material 200 is liquefied filament 902. The material 200 may exit the filament deliver system 900 through a material delivery system outlet 913 in fluid communication with a printhead inlet 914. The material 200 may be introduced into the printhead 100, for example, into the material chamber 120 of the printhead 100, through the printhead inlet 914 from the material delivery system outlet 913. The material delivery system outlet 913 and printhead inlet 913 may be heated. Once the material 200 is within the printhead 100, a printing operation may be performed as described above.

In an embodiment, the filament 902 may be a material that liquefies at a temperature of about 100° C. or above, or about 200° C. or above, or about 300° C. or above. In an embodiment, the filament 902 may be a material such as polylactic acid (PLA), acrylonitrile butadiene styrene (ABS), nylon polyamide, polyethylene terephthalate (PET), thermoplastic elastomer (TPE), polycarbonate (PC), a polyetherimide such as ULTEM™, or another sufficient material. The material used may include an embedded component such as one or more reinforcing materials, for example, carbon fiber.

In the embodiment of FIG. 9, the material chamber 120 may always be under pressure. Thus continued torque or pressure placed on the filament 902 at a nip 916 between the feed wheels 906 may result in slippage of the feed wheels 906. This may occur when the resistance to feeding becomes too great when the filament is not feeding freely, for example, if the orifice 110 becomes blocked with solid print material or when the orifice 110 is too close to the print surface.

Figure 10:
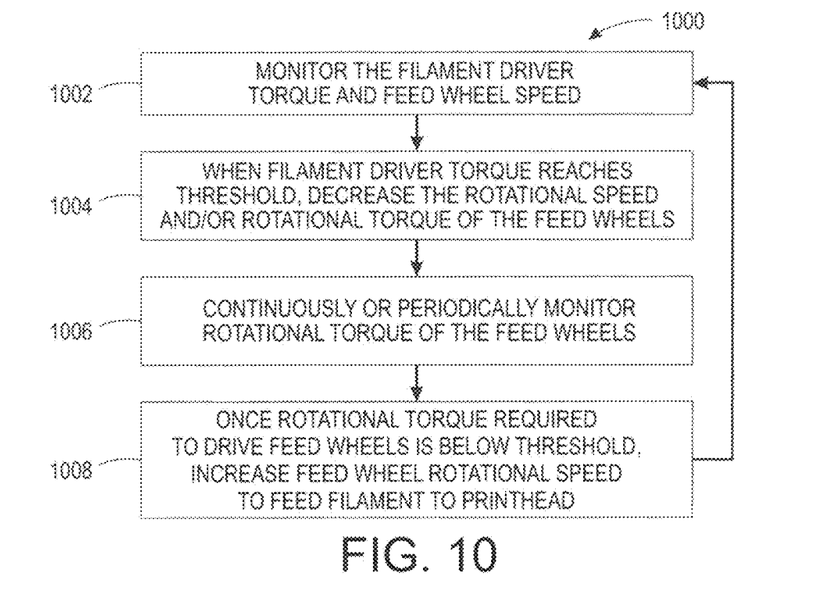
FIGS. 10-12 illustrate various methods for printing according to an embodiment.
Figure 11:
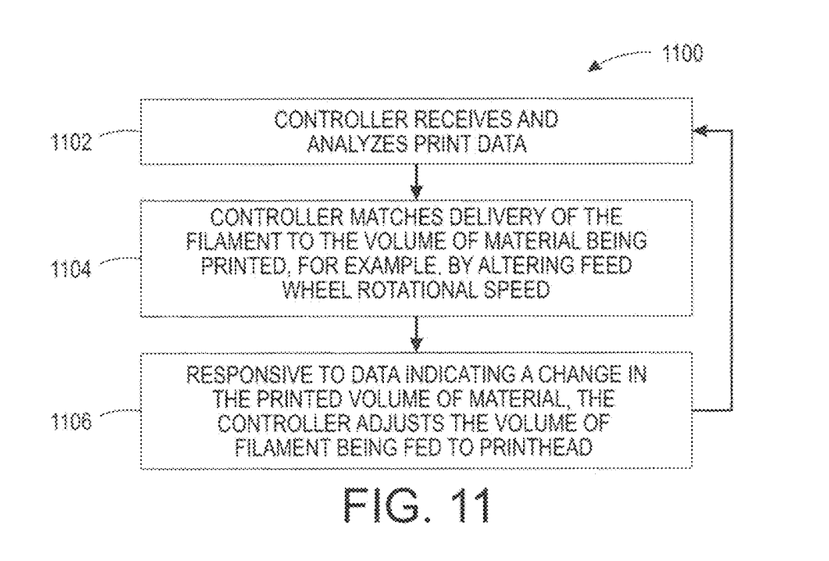

In an embodiment, as illustrated in FIG. 9, the material delivery system 900 can further include a controller 918. The controller 918 is configured to monitor a filament driver torque, for example, a rotational torque of at least one of the feed wheels 906. The controller 918 is further configured to monitor and control a rotational speed of at least one of the feed wheels 906. In a method for printing 1000 as illustrated in FIG. 10, the controller 918 monitors the filament driver torque and feed wheel torque, as illustrated at 1002. As the rotational torque required to maintain a given rotational speed of the speed wheel increases, the controller assumes the feed resistance is increasing. Responsive to the feed resistance (i.e., the increasing torque of the measured feed wheel at the rotational speed) reaching a threshold or increasing, the controller 918 reduces the torque and rotational speed of the feed wheels 906 to prevent the feed wheels 906 from slipping on the filament 902 as illustrated at 1004. The rotational torque is then continually or periodically monitored by the controller 918, for example, by attempting to drive the feed wheel 906 and monitoring the torque. Responsive to the rotational torque required to drive the feed wheels 906 being below the threshold, the controller may increase the rotational speed and/or rotational torque of the feed wheels 906 to continue feeding the filament 902 to the printhead 100 as illustrated at 1008. Feeding of the filament 902 and monitoring of the filament driver torque and feed wheel speed may then continue.

Figure 12:
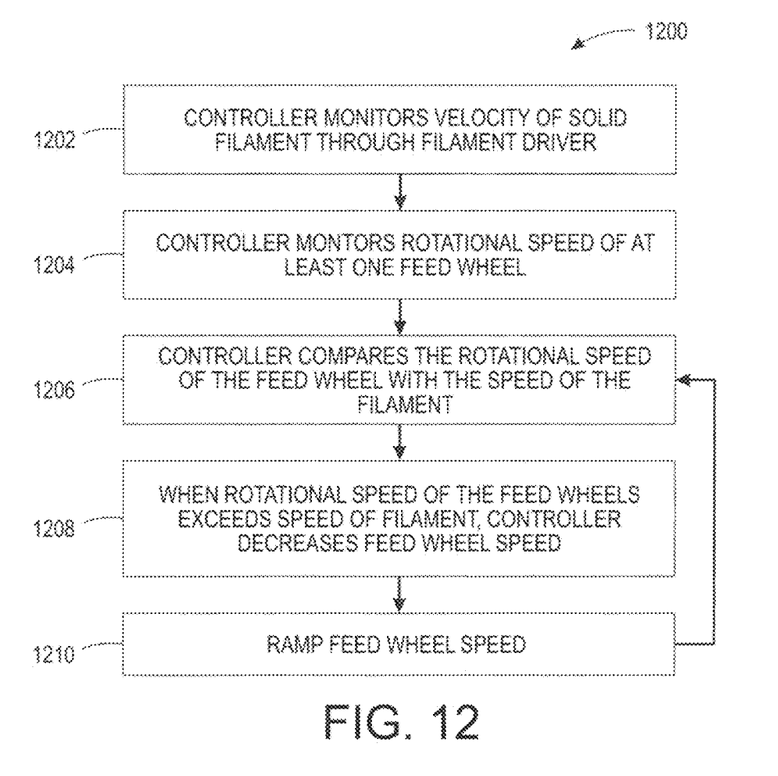

In another embodiment for printing 1100 as illustrated in FIG. 12, the controller 918 receives and analyzes print data, for example, from the 3D printing system as illustrated at 1102. The print data may include the volume of material being printed at a given instant or over a given time, or data that can be converted thereto. The controller 918 then matches the delivery of the filament 902 to the volume of material being printed by controlling the rotational speed of the feed wheels 906 as illustrated at 1104. In other words, the amount of solid filament 902 fed into the printhead 100 corresponds to the amount of liquid material 200 being ejected from the pin chambers 140 through the orifices 110. When printing has been paused or the volume of material being printed has changed, the print data indicates that the volume of material 200 being ejected from the pin chamber 140 through the orifice 110 has stopped or changed, and the controller 918 may stop feeding solid filament by stopping rotation of the feed wheels 906, or changing the volume of the material 200 supplied to the printhead 100 by changing the rotational speed of the feed wheels 906 as illustrated at 1106.

In another embodiment for printing 1200 as illustrated in FIG. 12, the controller 918 may monitor the speed of the solid filament 902 as it is fed through the filament driver as illustrated at 1202. The speed of the filament may be measured using a vision system, or through the use of a mechanical counter that maintains physical contact with the solid filament and rotates to measure the speed at which the filament is being fed through the filament driver 902. The controller further monitors the rotational speed of the feed wheels 906 as illustrated at 1204, and compares the rotational speed of the feed wheels 906 with the speed of the filament 902 as illustrated at 1206. Responsive to the rotational speed of the feed wheels 906 being greater than the speed or length of filament 902 being fed, the controller 918 assumes the feed wheels 906 are slipping on the filament 902 and reduces the rotational speed of the feed wheels 906 until the length of filament 902 being fed matches the rotational speed of the feed wheels 906 as illustrated at 1208. Once the rotation of the feed wheel 906 matches the speed of the filament, the rotational speed of the feed wheels may be ramped as illustrated at 1210, and the cycle of comparing the rotational speed of the feed wheels 906 and speed of the filament 902 may continue.

The material delivery system 900 of FIG. 9 may be a closed system such that the liquid material 200 is not exposed to air from the time it is transformed to a pliable filament 912 and a liquid material 200 until it is positioned within the pin chamber 140 and ejected from the printhead 100 through the orifice 110. Because the molten material 200 is not exposed to air, oxidation of the molten material 200 and any resulting physical decomposition or degradation resulting therefrom is reduced or eliminated.

In an embodiment, pressure within the material chamber 120 is supplied by the material delivery system 900, for example, through pressure applied by the filament driver 906. The pressure within the material chamber 120 results in the liquefied material 200 entering the pin chamber 140 through the channel 130.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. A 3D printer, comprising:
    a pin actuated printhead, comprising:
        a plurality of material chambers to hold different types of material to be elected;
        a plurality of printhead inlets in fluid communication with the material chambers;
        a plurality of orifices from which the material is ejected;
        a plurality of channels connecting the material chambers to the orifices; and
        a plurality of actuated pins that are configured to enter the orifices and to control ejection of the material from the orifices,
        wherein, the printhead is configured to eject a material with a viscosity of 10,000 centipoise (cP) or more at an elevated temperature and to mix the different types of the material after ejection of the material through the orifices; and
    a material delivery system, comprising:
        a plurality of material delivery system outlets in fluid communication with the printhead inlets;
        a plurality of filament drivers; and
        a plurality of filament heaters.

2. The 3D printer of claim 1, further comprising:
    a plurality of solid filaments positioned within the filament drivers; and
    material within the material chambers, wherein the material comprises liquefied filament.

3. The 3D printer of claim 2, wherein:
    the filament drivers each comprise a first feed wheel, a second feed wheel, and a nip between the first feed wheel and the second feed wheel; and
    at least one of the solid filaments is positioned within the nip.

4. The 3D printer of claim 3, wherein the material delivery system further comprises a controller configured to control at least one of a rotational speed and a rotational torque of at least one of the first feed wheel and the second feed wheel.

5. The 3D printer of claim 4, wherein the material delivery system is configured to maintain a pressure within a given material chamber through the rotational torque of at least one of the first feed wheel and the second feed wheel.

6. The 3D printer of claim 1 wherein:
    each actuated pin comprises a first open position and a second closed position;
    each actuated pin is configured to allows material to enter into the orifice when in the first open position; and
    each actuated pin is configured to block material from entering the orifice when in the second closed position.

7. The 3D printer of claim 6, wherein each of the actuated pins is configured such that a duration of time of each of the actuated pins in the first open position determines a volume of the material ejected.

8. The 3D printer of claim 6, wherein in the closed position, each of the actuated pins protrudes past a plane defining an outer surface of the orifice.

9. The 3D printer of claim 1, where the plurality of pins comprise a metallic wire.

10. The 3D printer of claim 1, where the plurality of pins are coated with a low adhesion coating to facilitate separation of the ejected material from the pins.

11. The 3D printer of claim 1, where the printhead is spaced apart from a surface receiving the ejected material such that the ejected material becomes airborne when traveling from the orifices to the receiving surface.

12. The 3D printer of claim 1, where the printhead is spaced close to a surface receiving the ejected material such that the pins carry the ejected material to the receiving surface.

13. A 3D printer, comprising:
    a pin actuated printhead, comprising:
        a plurality of material chambers to hold material to be ejected;
        a plurality of printhead inlets in fluid communication with the material chambers;
        a plurality of orifices from which the material is ejected;
        a plurality of channels connecting the material chambers to the orifices, wherein different material chambers are connected to different orifices via different channels; and
        a plurality of actuated pins that are configured to enter the orifices and to control ejection of the material from the orifices,
        wherein, the printhead is configured to eject a material with a viscosity of 10,000 centipoise (cP) or more at an elevated temperature; and
    a material delivery system, comprising:
        a plurality of material delivery system outlets in fluid communication with the printhead inlets;
        a plurality of filament drivers; and
        a plurality of filament heaters.

* * * * *